(12) United States Patent
Thongam et al.

(10) Patent No.: US 12,673,559 B2
(45) Date of Patent: ***Jul. 7, 2026

(54) OVER-TEMPERATURE MANAGEMENT OF DC LINK CAPACITOR IN ELECTRIC VEHICLE PROPULSION DRIVE CONVERTER

(71) Applicant: FORD GLOBAL TECHNOLOGIES, LLC, Dearborn, MI (US)

(72) Inventors: Jogendra Singh Thongam, Windsor (CA); Serdar Hakki Yonak, Ann Arbor, MI (US); Joseph Sherman Kimmel, Carleton, MI (US); Papiya Bagchi, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 826 days.

This patent is subject to a terminal disclaimer.

(21) Appl. No.: 17/959,635

(22) Filed: Oct. 4, 2022

(65) Prior Publication Data

US 2024/0109434 A1     Apr. 4, 2024

(51) Int. Cl.
| | |
|---|---|
| *H02J 7/34* | (2006.01) |
| *B60L 50/40* | (2019.01) |
| *H02J 7/65* | (2026.01) |

(52) U.S. Cl.
CPC .............. *B60L 50/40* (2019.02); *H02J 7/345* (2013.01); *H02J 7/65* (2026.01)

(58) Field of Classification Search
None
See application file for complete search history.

(56) References Cited

U.S. PATENT DOCUMENTS

| | | | |
|---|---|---|---|
| 8,421,391 | B2 | 4/2013 | Yeh et al. |
| 8,487,575 | B2 | 7/2013 | Yeh et al. |
| 2009/0052210 | A1 | 2/2009 | Ward et al. |
| 2009/0063070 | A1 | 3/2009 | Renneberg |
| 2014/0002104 | A1* | 1/2014 | Yang ...................... G01R 31/64 |
| | | | 324/548 |
| 2021/0018016 | A1 | 1/2021 | Kim et al. |
| 2022/0149748 | A1* | 5/2022 | Herold ................ H02M 7/5395 |

FOREIGN PATENT DOCUMENTS

| | | | | |
|---|---|---|---|---|
| DE | 102015205892 A1 * | 10/2016 | .............. | H02M 1/32 |
| EP | 3199929 A1 * | 8/2017 | .............. | G01K 7/16 |
| JP | 2017108546 A | 6/2017 | | |

* cited by examiner

*Primary Examiner* — Richard Isla
(74) *Attorney, Agent, or Firm* — David B. Kelley; Brooks Kushman P.C.

(57) ABSTRACT

After start of an electric drive system, a controller reduces power output of an inverter responsive to sensed temperature of a power switch of the inverter, sensed current of a power electronics module, sensed DC-link voltage, and thermal impedance parameters of a DC-link capacitor being indicative of an estimated temperature of the DC-link capacitor that is greater than a threshold to maintain DC-link capacitor temperature lower than the threshold.

8 Claims, 4 Drawing Sheets

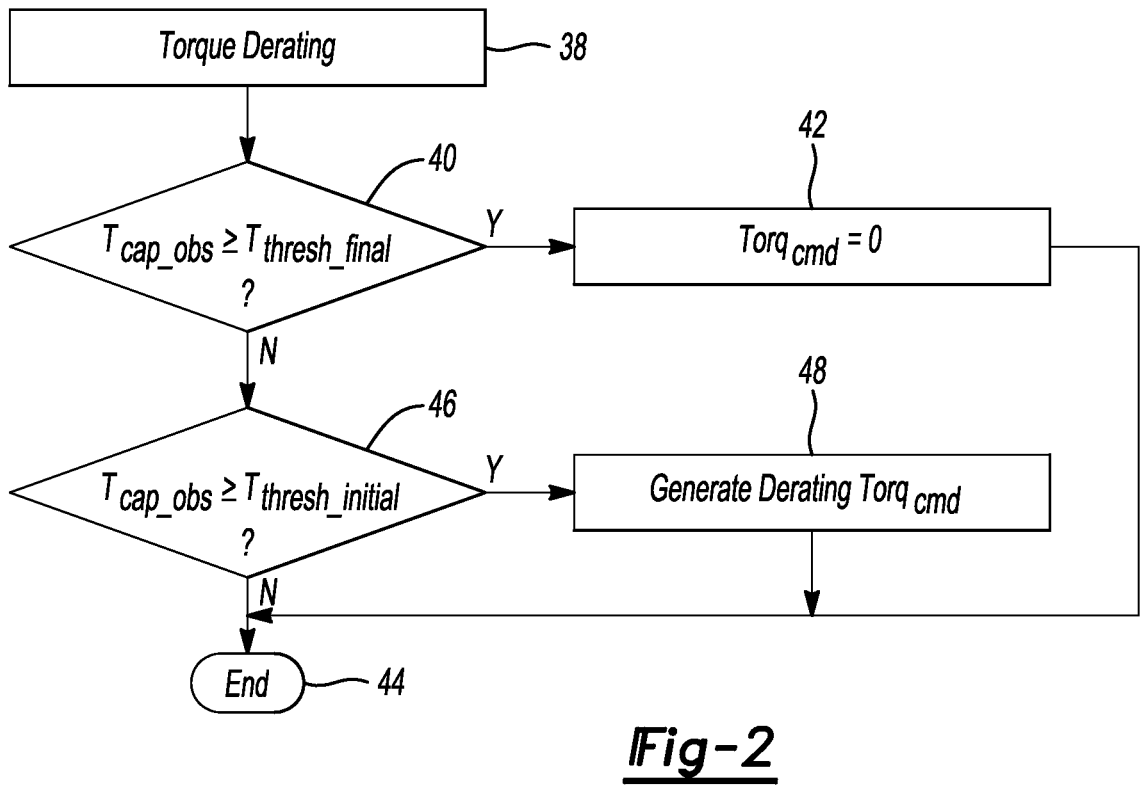
$$\textit{Fig-2}$$
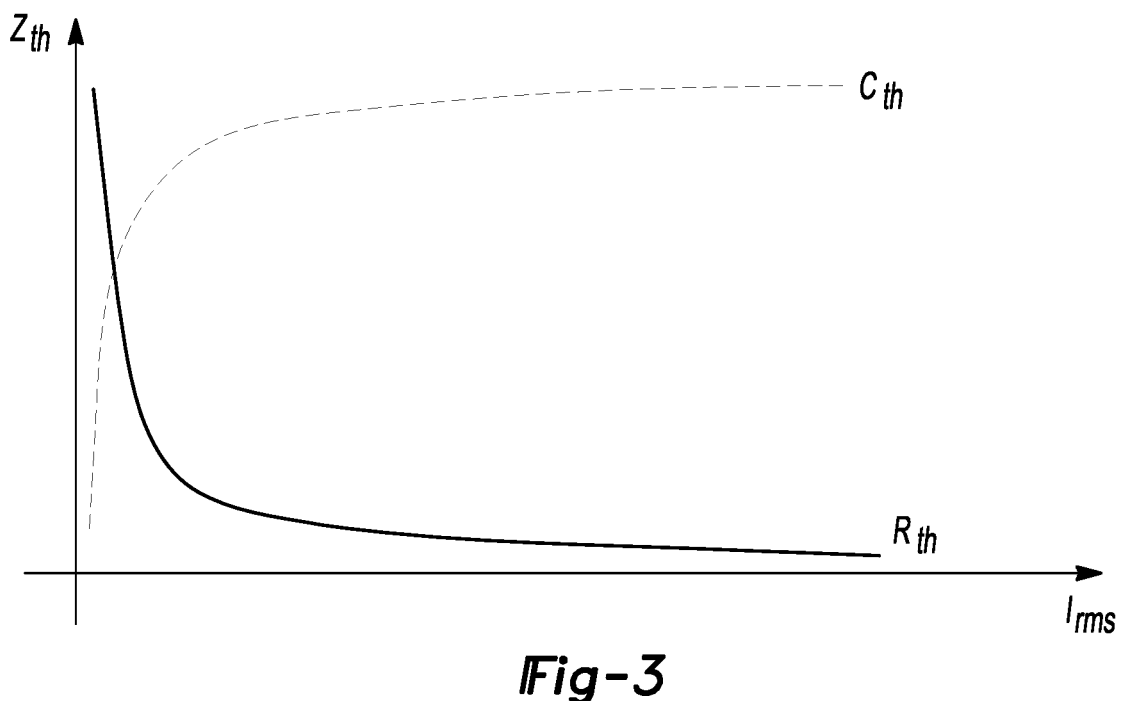
$$\textit{Fig-3}$$

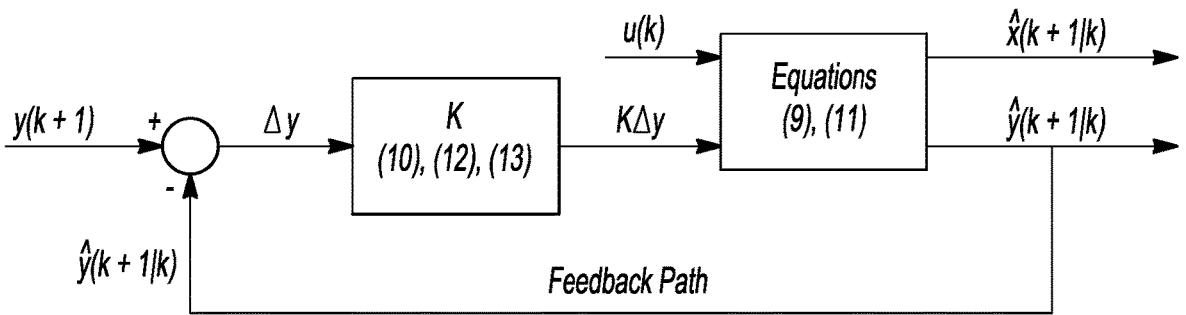
$$\underline{\mathit{Fig\text{-}4}}$$
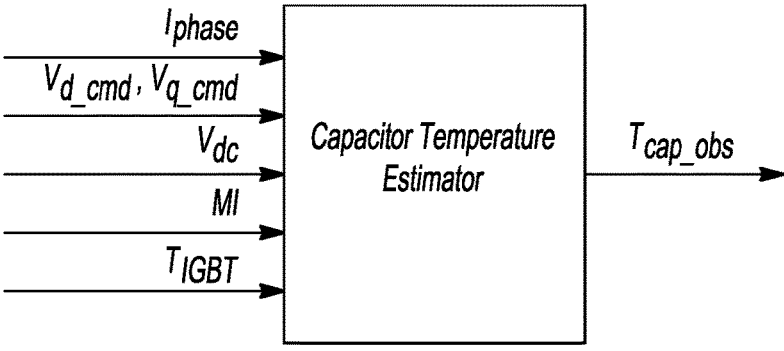
$$\underline{\mathit{Fig\text{-}5}}$$

OVER-TEMPERATURE MANAGEMENT OF DC LINK CAPACITOR IN ELECTRIC VEHICLE PROPULSION DRIVE CONVERTER

TECHNICAL FIELD

This disclosure relates to automotive power systems.

BACKGROUND

Certain vehicles may be propelled by an electric machine that transforms electrical energy to mechanical energy. A traction battery may be the source of the electrical energy. Various systems may be used to condition the electrical energy from the traction battery before it is delivered to the electric machine.

SUMMARY

An electric drive system includes a power electronics module having a DC-link capacitor and an inverter, and a controller. The controller, after start of the electric drive system, reduces power output of the inverter responsive to sensed temperature of a power switch of the inverter, sensed current of the power electronics module, sensed DC-link voltage, and thermal impedance parameters of the DC-link capacitor being indicative of an estimated temperature of the DC-link capacitor that is greater than a threshold to maintain DC-link capacitor temperature lower than the threshold.

A method includes, after starting an electric drive system, reducing power output of an inverter while sensed temperature of a power switch of the inverter, sensed current of a power electronics module that includes the inverter, sensed DC-link voltage, and thermal impedance parameters of a DC-link capacitor are indicative of an estimated temperature of the DC-link capacitor being greater than a threshold to maintain DC-link capacitor temperature lower than the threshold.

An electric drive control system includes a controller that, after start of the electric drive system, reduces power output of an inverter responsive to an estimated temperature of a DC-link capacitor being greater than a threshold to maintain DC-link capacitor temperature lower than the threshold, and upon start of the electric drive system, generates an initial value for the estimated temperature based on a maximum allowable temperature that is less than the threshold under certain conditions and based on a last estimated temperature of the DC link capacitor under other conditions.

BRIEF DESCRIPTION OF THE DRAWINGS

In the following detailed description, reference is made to the accompanying figures, and in which are shown by way of illustration specific embodiments. Other embodiments of course are also contemplated and/or described.

FIG. 2 is a flow chart of an algorithm for torque derating operation.

FIG. 3 is a plot of thermal model parameters.

FIG. 4 is block diagram for capacitor temperature estimation.

FIG. 5 is a block diagram of a capacitor temperature estimator.

DETAILED DESCRIPTION

Figure 1:
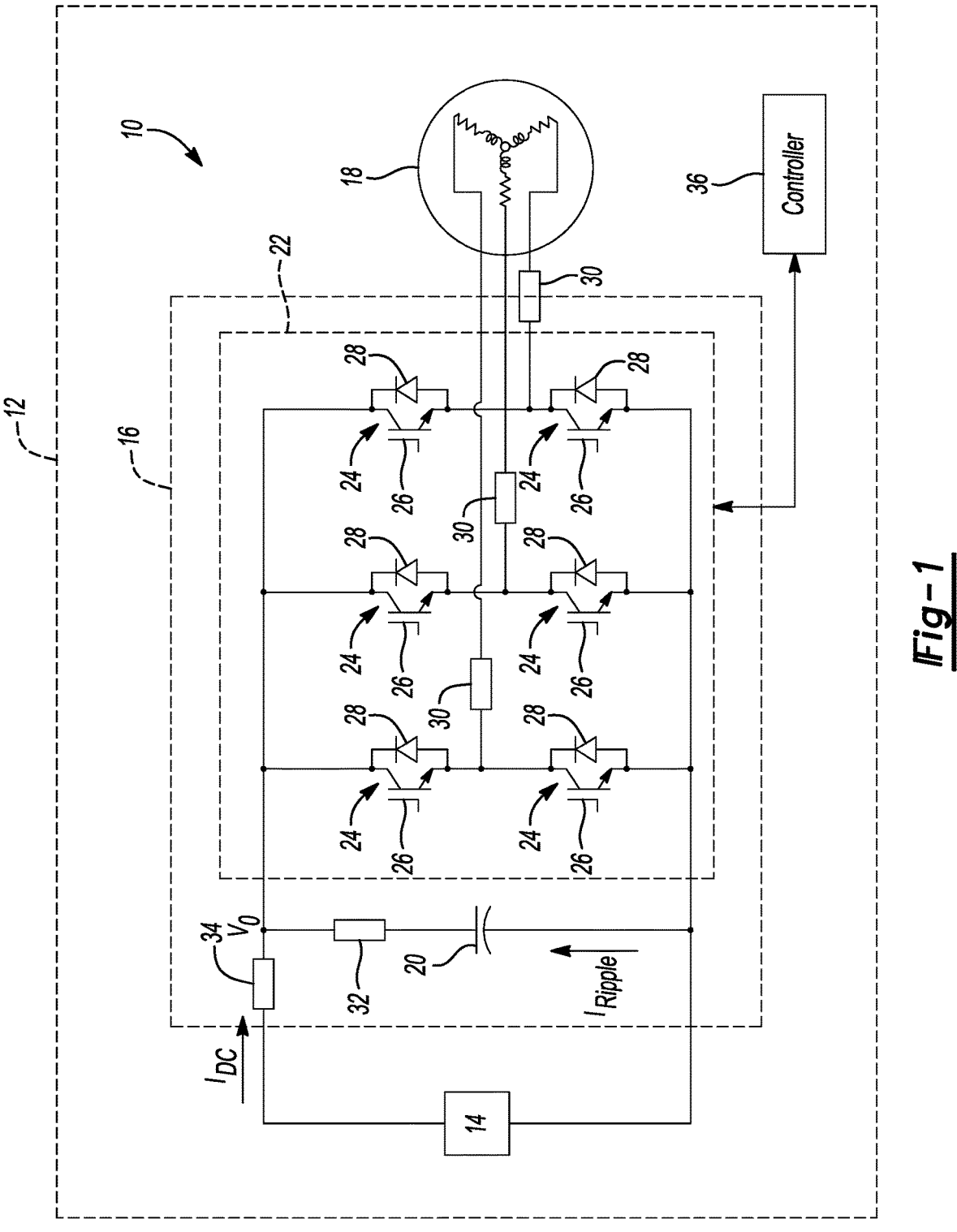
FIG. 1 is a schematic diagram of components of an electric drive system of an electric vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Issues with the DC-link capacitor in an electric vehicle propulsion drive converter system may trigger issues with other main components of the converter, possibly impairing use of the converter. Capacitor temperature exceeding the maximum temperature threshold value may contribute to such issues. Certain previous strategies prevent the converter from exceeding average current versus time thresholds. This approach is based on certain thermal conditions and can be too conservative, causing the inverter to de-rate even when the temperature of the DC-link capacitor is well below its maximum temperature threshold value, causing unnecessary reduction in vehicle performance.

Temperature of the propulsion drive converter capacitor can be measured using a dedicated temperature sensor. Sensor introduction for temperature measurement, however, may increase complexity and challenge packaging constraints. It may therefore be helpful to estimate the temperature of the component to maximize the capacitor usage while still preventing certain issues from occurring.

Over-temperature management strategies for DC-link capacitors in electric vehicle propulsion drive converters are contemplated. In certain examples, such can be achieved by derating the propulsion drive motor torque depending on the value of estimated capacitor temperature relative to the maximum threshold temperature, which in turn lowers or stops the capacitor heating. Certain embodiments are based on capacitor temperature estimation that relies on determining the reference temperature and start-up temperature of the capacitor to allow good estimation results. The start-up temperature (the capacitor estimated temperature at activation/key-on) computed using the last estimated capacitor temperature and the insulated-gate bipolar transistor (IGBT) base temperature, drives the estimated temperature at key-on to be reasonably close to the actual capacitor temperature allowing close estimation of the capacitor temperature.

Under keep-alive memory (KAM) loss, due to for example a 12V reset, the algorithm may force the estimated temperature to take the highest calibratable temperature of the capacitor close to the derating threshold value. The algorithm uses the IGBT base temperature as the reference temperature and implements a Kalman filter observer for estimating the capacitor temperature. The IGBT base temperature may also be used in the algorithm for feedback correction. The temperature estimation may be based on the knowledge of temperature of circuit components housed in the same casing as that of the capacitor, the temperature rise due to heat transferred from the DC busbar, and the temperature rise due to heat generated in the capacitor due to ripple current flowing through it.

Capacitor over-temperature management may thus be realized by derating propulsion drive motor torque depending on the value of the estimated capacitor temperature relative to the maximum threshold temperatures.

Certain battery electric propulsion drive converters include a battery with a voltage that supplies a propulsion drive motor through a three-phase IGBT bridge converter with its DC-link capacitor. The IGBT temperature, three phase currents, and Vdc are measured. The converter supplying the propulsion drive motor is controlled to deliver required torque commanded by the controller. A continuous peak temperature operation of a propulsion drive converter DC-link capacitor, without exceeding its maximum threshold temperature, is realized using a derating control which forces the temperature to stay below the maximum threshold temperature, thereby providing it over-temperature protection.

Referring to FIG. 1, an electric drive system 10 of vehicle 12 includes a traction battery 14, power electronics module 16, and electric machine (i.e., motor) 18. The power electronics module 16 and motor 18 (and associated controllers) constitute an "eDrive" unit of the electric drive system 10.

The power electronics module 16 is coupled between the battery 14 and motor 18. The power electronics module 16 converts DC electrical power provided from the battery 14 into AC electrical power for the motor 18. In this way, the power electronics module 16 drives the motor 18 with power from the battery 14 to propel the vehicle 12.

The power electronics module 16 includes a DC-link capacitor 20 and an inverter 22, or inverter control system (ICS). The inverter 22 is one example. The DC-link capacitor 20 is disposed between the battery 14 and inverter 22 and is connected in parallel with the battery 14. The DC-link capacitor 20 is operable to absorb ripple currents generated by operation of power switching units 24 of the inverter 22 and stabilize a DC-link voltage Vo for inverter control.

Inverters convert DC power to multi-phase AC power (three-phase being most common). Inverters can move electrical power in either direction (bi-directional) either driving an electric machine (i.e., motoring) or electrically braking the electric machine (i.e., generating). An inverter system is made up of a combination of power electronic hardware and control software. Electrical current can be quickly adjusted by opening and closing the power switches in the inverter.

Many inverter systems, including inverters relevant to the strategies contemplated herein, perform closed-loop current control to precisely control the motor. To achieve this, the electric current in each phase of the inverter is sensed with a current sensor and a corresponding signal is provided to the controller of the inverter system. The most common approach is to sense all of the phases, but any one phase current can be inferred from knowledge of the other phase currents. The current sensor can use and/or be implemented with different technologies. Current sensors shown in FIG. 2, and discussed below, are but one example. Such current sensors are typically integrated into the inverter.

The inverter 22 includes inverting circuitry and heat generating components such as a plurality of power switching units 24. In this example, the inverter 22 includes three sets of pairs of the power switching units 24. Each pair of the power switching units 24 includes two of the power switching units 24 connected in series. Each of the power switching units 24 includes a power switch 26, in the form of a transistor, arranged anti-parallel with a diode 28. In this example, the transistor 26 is an IGBT. Each pair of the power switching units 24 is connected in parallel with the battery 14 and DC-link capacitor 20 and thereby each pair of the power switching units 24 forms a "phase" of the inverter 22. In this way, the inverter 22, having three pairs of the power switching units 24, is a three-phase inverter operable for converting DC electrical power from the battery 14 into three-phase AC electrical power for the motor 18.

As suggested above, each phase of the inverter 22 includes a current sensor 30. Each of the current sensors 30 can be a resistive shunt connected in series with the output of the corresponding phase. The current sensors 30 are operable for sensing the electrical current (IAC) output from the corresponding phases of the inverter 22 to the motor 18.

Further, a current sensor 32 is associated with the DC-link capacitor 20. For instance, the current sensor 32 is a resistive shunt connected in series with the DC-link capacitor 20. The current sensor 32 is operable for sensing an electrical ripple current ($I_{Ripple}$) of the DC-link capacitor 20. Alternatively, the ripple current ($I_{Ripple}$) of the DC-link capacitor 20 can calculated based on various operating parameters as known in the art.

Further, a current sensor 34 is associated with the input of the inverter 22. For instance, the current sensor 34 is a resistive shunt connected in series with the input of the inverter 22 (i.e., extending towards the inverter 22 from the node at which the battery 14, DC-link capacitor 20, and inverter 22 are connected). The current sensor 34 is operable for sensing an electrical input DC current ($I_{DC}$) drawn by the inverter 22.

The power electronics module 16 has an associated controller 36. The controller 36 can be a microprocessor-based device. The controller 36 is configured to monitor operation of the DC-link capacitor 20 and to monitor and control operation of the inverter 22 according to the algorithms and strategies discussed below. Particularly, the controller 36 is operable to control operation of the power switches 26 to cause the inverter 22 to convert a given DC electrical power provided from the battery 14 via the DC-link capacitor 20 into a desired AC electrical power for the motor 18. The controller 34 is in communication with the current sensors 30 to monitor the AC electrical power provided from the inverter 22 to the motor 18. The controller 36 uses information from the current sensors 30 as feedback in controlling the inverter 22 to output the desired AC electrical power to the motor 18.

The power switches 26 are associated with temperature sensors (e.g., thermistors) (not shown) which directly measure the temperature of the power switches 26. For example, each of the power switches 26 has embedded diodes therein which are configured to function as a temperature sensor operable for providing the temperature of the power switch 26. The controller 36 is in communication with these temperature sensors to monitor the temperatures of the power switches 26. The controller 36 may control operation of the inverter 22 according to the monitored temperatures of the power switches 26 to prevent overheating.

Notably, the temperature of the DC link capacitor 20 is not directly measurable. The DC-link capacitor 20 and components of the inverter 22 are to be protected from excessive temperature caused by operation of the inverter 22 in converting the input power to the output power. In accordance with embodiments, a DC-link capacitor thermal model (e.g., a temperature schedule) is generated for use in a protection strategy such that the capability of the electric drive system 10 is not unnecessarily limited as the case may be with the protection strategy of limiting the time during which the inverter 22 operates at relatively high power (e.g., AC $I_{RMS}$) output levels. Accordingly, use of the DC-link capacitor thermal model is intended to enable the electric drive system 10 to be de-rated only when DC-link capacitor 20 and components of the inverter 22 may overheat.

Over-temperature protection is achieved by executing a torque derating operation, forcing the capacitor temperature to stay below the final temperature threshold value. The derating algorithm reads the estimated temperature $T_{cap\_obs}$ and lowers the torque command $T_{orq\_cmd}$ to not allow fast temperature rise when the temperature crosses the initial calibratable threshold value $T_{thresh\_initial}$. The derating routine continues its operation and finally a zero torque is applied if temperature continues to rise and touches the final threshold value $T_{thresh\_final}$. Over-temperature protection is realized by propulsion drive motor torque derating depending on the value of the estimated capacitor temperature relative to the maximum threshold temperatures $T_{thresh\_initial}$ and $T_{thresh\_final}$. Lowering $T_{orq\_cmd}$ effectively derates the inverter 22, which can be accomplished by reducing the input power received by the inverter 22 from the battery 14, modifying the switching schedule of the power switches 26, or pausing operation of the inverter 22 for a period of time, etc., as known in the art.

Referring to FIG. 2, at operation 38 the torque derating operation begins. At operation 40, it is determined whether $T_{cap\_obs}$ is greater than or equal to $T_{thresh\_final}$. If yes, $T_{orq\_cmd}$ is set to zero at operation 42. The algorithm then ends at operation 44. Returning to operation 40, if no, it is determined whether $T_{cap\_obs}$ is greater than or equal to $T_{thresh\_initial}$ at operation 46. If yes, a derating $T_{orq\_cmd}$ is generated at operation 48. The algorithm then ends at operation 44. Returning to operation 46, if no, the algorithm ends at operation 44.

The capacitor over-temperature protection is based on capacitor temperature estimation implemented using a Kalman Filter observer. The implementation steps to achieve capacitor over-temperature protection and further protection of the power electronics module 16 are described below.

Referring to FIG. 3, a capacitor thermal impedance base model is first developed. Laboratory tests are carried out at various load currents, and using the results obtained, a base thermal model is built. The thermal model built considers both the heat transferred from the DC busbars and self-heat generation due to ripple current flowing through the capacitor 20. That is, the thermal model is initially derived from testing a test version of the power electronics module 16 under a plurality of conditions in which for each of the conditions, a set of information is recorded including sensed temperature of at least one of the power switches 26, sensed current and voltage of the test version of the power electronics module 16, and sensed DC-link voltage of the test version of the power electronics module 16.

A system state space model of the capacitor 20 is developed using the thermal model described above. The state and output equations of the system are given below:

State Equation $$\dot{x} = Ax + Bu \tag{1}$$

$$\begin{bmatrix} \dot{x}_1 \\ \dot{x}_2 \\ \dot{T}_{cap} \end{bmatrix} = \begin{bmatrix} -\dfrac{1}{\tau_{th}} & 0 & 0 \\ 0 & -\dfrac{1}{\tau_{th}} & 0 \\ 0 & 0 & 0 \end{bmatrix} \begin{bmatrix} x_1 \\ x_2 \\ T_{cap} \end{bmatrix} + \begin{bmatrix} \dfrac{1}{\tau_{th}} & 0 & 0 \\ 0 & \dfrac{1}{\tau_{th}} & 0 \\ 0 & 0 & 1 \end{bmatrix} \begin{bmatrix} P_{L1} \\ P_{L2} \\ v \end{bmatrix} \tag{2}$$

-continued

Output Equation $$y = Cx + Du \tag{3}$$

$$\begin{bmatrix} v \\ T_{ref} \end{bmatrix} = \begin{bmatrix} 1 & 1 & 0 \\ -1 & -1 & 1 \end{bmatrix} \begin{bmatrix} x_1 \\ x_2 \\ T_{cap} \end{bmatrix} + \begin{bmatrix} 0 & 0 & 0 \\ 0 & 0 & 0 \end{bmatrix} \begin{bmatrix} P_{L1} \\ P_{L2} \\ v \end{bmatrix} \text{ where} \tag{4}$$

$$P_{L1} = I_{crms}^2 R_{ESR} R_{th} = I_{crms}^2 2MI \left\{ \frac{\sqrt{3}}{4\pi} + PF^2 \left( \frac{\sqrt{3}}{\pi} - \frac{9}{16} MI \right) \right\} R_{ESR} R_{th},$$

$$P_{L2} = I_{dc}^2 R_{dc} R_{th}, \ v = (P_{L1} + P_{L2})(1 - e^{-t/\tau_{th}}), \ \tau_{th} = R_{th} C_{th}, \ I_{crms}$$

is the rms ripple current of the capacitor, MI is the modulation index, PF is the power factor, $I_{dc}$ is the bus bar dc current, $T_{cap}$ is the capacitor temperature, and $T_{ref}$ is the reference temperature of the capacitor.

An observer algorithm for capacitor temperature estimation is then implemented. A capacitor temperature estimation algorithm can be developed using a Kalman filter observer. The observer algorithm is implemented using the state space model described above. The discrete time varying model of the capacitor 20 can be written as $$x(k+1) = A(k)x(k) + B(k)u(k) + W(k) \tag{5}$$

$$y(k) = C(k)x(k) + D(k)u(k) + V(k) \text{ where} \tag{6}$$

$$A(k) = \begin{bmatrix} 1 - \dfrac{T_s}{\tau_{th}} & 0 & 0 \\ 0 & 1 - \dfrac{T_s}{\tau_{th}} & 0 \\ 0 & 0 & 1 \end{bmatrix},$$

$$B(k) = \begin{bmatrix} \dfrac{T_s}{\tau_{th}} & 0 & 0 \\ 0 & \dfrac{T_s}{\tau_{th}} & 0 \\ 0 & 0 & T_s \end{bmatrix},$$

$$C(k) = \begin{bmatrix} 1 & 1 & 0 \\ -1 & -1 & 1 \end{bmatrix},$$

$$x(k) = \begin{bmatrix} x_1 \\ x_2 \\ T_{cap} \end{bmatrix},$$

$$u(k) = \begin{bmatrix} P_{L1}(k) \\ P_{L2}(k) \\ \dfrac{v(k+1) - v(k)}{T_s} \end{bmatrix},$$

$$y(k) = \begin{bmatrix} v \\ T_{ref} \end{bmatrix},$$

W(k) and V(k) are the system and measurement noises respectively. These noises are supposed to be white noise with zero mean and characterized by $$E\{W(k)\}=0, E\{W(k),W^T(k)\}=Q(k)>0 \tag{7}$$

$$E\{V(k)\}=0, E\{V(k),V^T(k)\}=R(k)>0 \tag{8}$$

The observer algorithm is executed as follows:
Prediction $$\hat{x}(k+1|k)=A(k)\hat{x}(k|k)+B(k)u(k) \tag{9}$$

$$P(k+1|k)=A(k)P(k|k)A^T(k)+Q(k) \tag{10}$$

where $\hat{x}(k)$ is the state estimate, and P(k) is the estimation error covariance matrix.

$$\hat{x}(k+1|k+1)=\hat{x}(k+1|k)+K(k+1)\{y(k+1)-\hat{y}(k+1|k)\} \tag{11}$$

$$K(k+1)=P(k+1|k)C^T(k+1)\{C(k+1)P(k+1|k)C^T(k+1)+R (k+1)\}^{-1} \tag{12}$$

$$P(k+1|k+1)=P(k+1|k)-K(k+1)H(k+1)P(k+1|k) \tag{13}$$

where K is the Kalman gain matrix, and (k+1|k) denotes the prediction at time (k+1) based on data up to and including k.

Referring to FIG. 4, the difference between y(k+1) and $\hat{y}$(k+1|k) is computed to generate Δy, which is provided to the Kalman gain matrix embedding equations (10), (12), and (13) therein, resulting in KΔy. KΔy and u(k) are then used in equations (9) and (11) to produce the predictions $\hat{x}$(k+1|k) and $\hat{y}$(k+1|k).

The reference temperature (Tref) and temperature rise (v) are the observer reference signals. They are used by the estimation algorithm for feedback correction in the update algorithm. The reference temperature is the IGBT base temperature, obtained from the measured IGBT temperature in an observation window discussed below.

The capacitor model is adjusted to best fit the drive cycles. The vehicle is test driven at various drive cycles and the model parameters are iteratively adjusted to best fit the drive cycles. During the drive cycles, phase current, direct and quadrature voltage commands, DC voltage, modulation index, and IGBT temperature data are collected and used for the fine adjustment of the model.

Referring to FIG. 5, the observer can then be fined tuned to get the best possible temperature estimation results for the drive cycles. The inputs to the estimation algorithm are phase current, $I_{phase}$, direct and quadrature voltage commands, $V_{d\_cmd}$ and $V_{q\_cmd}$, DC voltage, $V_{dc}$, modulation index, MI, and IGBT temperature, $T_{IGBT}$. These input variable values are collected and used in fine tuning the algorithm.

Capacitor temperature information, $T_{cap}$, can thus be obtained by implementing the Kalman filter observer algorithm without requiring a dedicated temperature sensor. The algorithm uses the IGBT base temperature with/without an offset value as the reference temperature for the estimation. The IGBT base temperature is the coolest temperature of the IGBT within an observation window during vehicle operation which gives the best estimate of the capacitor temperature. This window moves along with time during the operation and its length is selected depending on which value gives the best result for a given vehicle. The acceptable duration is, depending on the type of drive cycle, about 1 sec to 100 sec. The reference temperature of the capacitor is the temperature at which the capacitor temperature will finally settle down if no heat is produced and allowed to cool down for an infinite amount of time.

Figure 6:
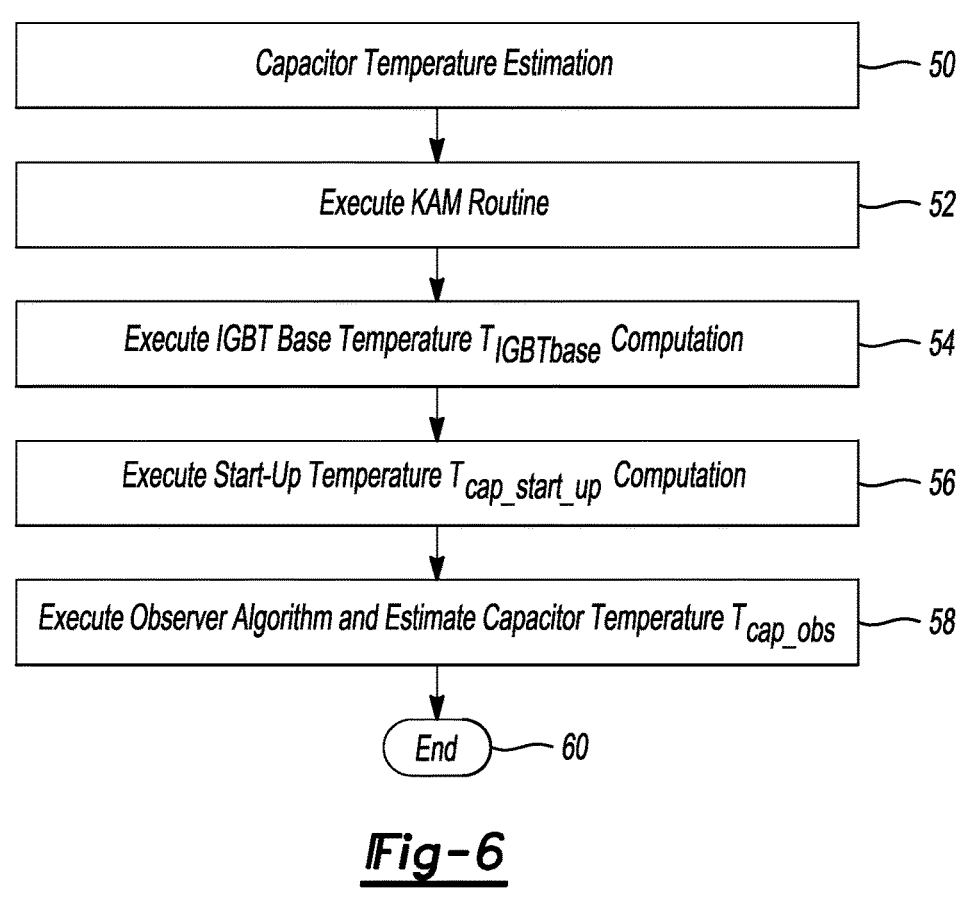
FIG. 6 is a flow chart of an algorithm for capacitor temperature estimation.

Referring to FIG. 6, at operation 50, the capacitor temperature estimation begins. At operation 52, the KAM routine (described below) is executed. At operation 54, the IGBT base temperature $T_{IGBTbase}$ computation is executed. At operation 56, the start-up temperature $T_{cap\_start\_up}$ computation is executed. At operation 58, the observer algorithm is executed and the capacitor temperature $T_{cap\_obs}$ is estimated. At operation 60, the algorithm then ends.

Figure 7:
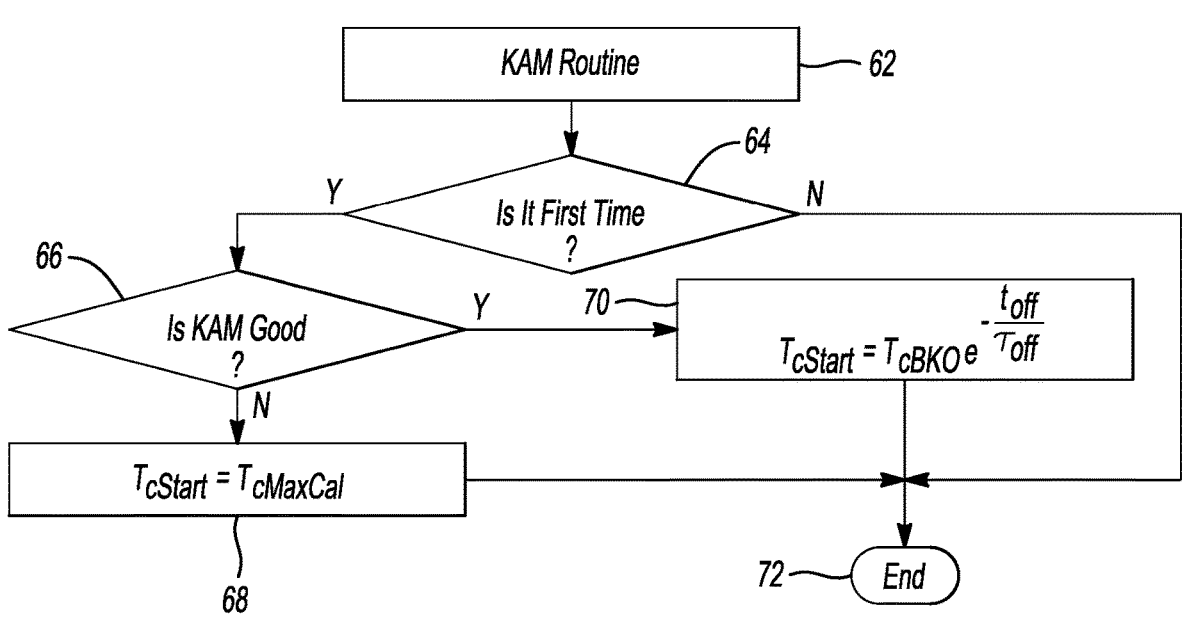
FIG. 7 is a flow chart of an algorithm for a keep alive memory routine.

Referring to FIG. 7, under KAM loss, when previously stored capacitor data has been wiped out, the KAM routine beings at operation 62. When the vehicle is in key on mode, the algorithm checks whether it is executing for the first time in the current key-cycle at operation 64. If it finds that it is the first time, it checks whether the data available in the KAM is good using known techniques at operation 66.

Depending on whether the KAM is good or bad, one of the two actions follows: If the KAM is not good, the start temperature $T_{cStart}$ is loaded with the value at "highest calibratable value of the capacitor temperature" ($T_{cMaxCAL}$) close to the threshold at operation 68. This is done to protect the capacitor hardware in case of a 12V reset, due to which the KAM, where last capacitor temperature is stored, is lost. By setting it so, the hardware will be protected in case the capacitor temperature was high and close to threshold value. If the estimated capacitor temperature rises above this threshold, torque derating will be started to protect the capacitor 20. If the KAM is good at operation 70, the start temperature $T_{cStart}$ is computed as $$T_{cStaty} = T_{cBKO}e^{-\frac{t_{off}}{\tau_{off}}}$$

where, $T_{cBKO}$ is the last estimated temperature of the capacitor before key-off, $t_{off}$ is the vehicle off time, and $\tau_{off}$ is the capacitor off time constant. The algorithm ends at operation 72.

The start-up temperature, which is the capacitor estimated temperature at key-on, computed using the last capacitor estimated temperature and IGBT base temperature, drives the estimated temperature at key-on to be reasonably close to the actual capacitor temperature allowing close estimation of the capacitor temperature. This enables capacitor over-temperature protection with accuracy. The start-up temperature of the capacitor 20 is given as $$T_{cap\_start\_up} = T_{cStart} + T_{IGBTbase}\left(1 - e^{-\frac{t_{off}}{\tau_{off}}}\right).$$

Its computation depending on KAM status is as follows:
1. If KAM is good, $$T_{cap\_start\_up} = T_{cBKO}e^{-\frac{t_{off}}{\tau_{off}}} + T_{IGBTbase}\left(1 - e^{-\frac{t_{off}}{\tau_{off}}}\right).$$

2. If KAM is not good, $T_{cap\_start\_up}=T_{cMaxCAL}$ as $t_{off}$ is initialized to a zero value.

The capacitor and the IGBTs of the power electronics module 16 are in the same housing. Therefore, when the vehicle 12 is in deactivated/key-off mode for a long time, both cool down to the same temperature. When the vehicle 12 is keyed on after a long $t_{off}$, long enough for the first term to be close to zero, the estimator will start from the IGBT temperature. As both the capacitor 20 and IGBT 26 were soaked to ambient for a long time, they will be at the same temperature. If the time duration between the key-off and a subsequent key-on is short, this equation loads the estimation temperature close to the last estimated capacitor temperature.

Torque derating to limit capacitor temperature below the maximum threshold value can then be executed. The temperature estimation result is used for capacitor protection through torque derating of the propulsion drive motor 18. Depending on the estimated capacitor temperature value with respect to the threshold temperature, the derating torque command value is applied, which in turn lowers or stops the capacitor heating.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The estimation algorithm, for example, could be implemented using the system equations below:

State Equation First Exmaple Alterntive $$\dot{x} = Ax + Bu \tag{A1}$$

$$\begin{bmatrix} \dot{x}_1 \\ \dot{x}_2 \\ \dot{T}_{cap} \end{bmatrix} = \begin{bmatrix} -\dfrac{1}{\tau_{th}} & 0 & 0 \\ 0 & -\dfrac{1}{\tau_{th}} & 0 \\ 0 & 0 & 0 \end{bmatrix} \begin{bmatrix} x_1 \\ x_2 \\ T_{cap} \end{bmatrix} + \begin{bmatrix} \dfrac{1}{\tau_{th}} & 0 & 0 \\ 0 & \dfrac{1}{\tau_{th}} & 0 \\ 0 & 0 & 1 \end{bmatrix} \begin{bmatrix} P_{L1} \\ P_{L2} \\ \dot{v} \end{bmatrix} \tag{A2}$$

Output Equation First Example Alternative $$y = Cx + Du \tag{A3}$$

$$[T_{ref}] = [-1 \quad -1 \quad 1] \begin{bmatrix} x_1 \\ x_2 \\ T_{cap} \end{bmatrix} + \begin{bmatrix} 0 & 0 & 0 \\ 0 & 0 & 0 \end{bmatrix} \begin{bmatrix} P_{L1} \\ P_{L2} \\ \dot{v} \end{bmatrix} \tag{A4}$$

State Equation Second Example Alternative $$\dot{x} = Ax + Bu \tag{A5}$$

$$\begin{bmatrix} \dot{x}_1 \\ x_2 \\ \dot{T}_{cap} \end{bmatrix} = \begin{bmatrix} -\dfrac{1}{\tau_{th}} & 0 & 0 \\ 0 & -\dfrac{1}{\tau_{th}} & 0 \\ -\dfrac{1}{\tau_{th}} & -\dfrac{1}{\tau_{th}} & 0 \end{bmatrix} \begin{bmatrix} x_1 \\ x_2 \\ T_{cap} \end{bmatrix} + \begin{bmatrix} \dfrac{1}{\tau_{th}} & 0 \\ 0 & \dfrac{1}{\tau_{th}} \\ \dfrac{1}{\tau_{th}} & \dfrac{1}{\tau_{th}} \end{bmatrix} \begin{bmatrix} P_{L1} \\ P_{L2} \end{bmatrix} \tag{A6}$$

Output Equation Second Example Alternative $$y = Cx + Du \tag{A7}$$

$$[T_{ref}] = [-1 \quad -1 \quad 1] \begin{bmatrix} x_1 \\ x_2 \\ T_{cap} \end{bmatrix} + [0 \quad 0] \begin{bmatrix} P_{L1} \\ P_{L2} \end{bmatrix} \tag{A8}$$

The words used in the specification are words of description rather than limitation, and it is understood that various changes may be made without departing from the spirit and scope of these disclosed materials. The terms controller and controllers, for example, may be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:
after starting an electric drive system, reducing power output of an inverter while sensed temperature of a power switch of the inverter, sensed current of a power electronics module that includes the inverter, sensed DC-link voltage, and thermal impedance parameters of a DC-link capacitor are indicative of a temperature of the DC-link capacitor being greater than a threshold to maintain the temperature lower than the threshold;
obtaining the thermal impedance parameters of the DC-link capacitor from a thermal model of the DC-link capacitor; and
initially deriving the thermal model from testing a test version of the power electronics module under a plurality of conditions in which for each of the conditions a set of information is recorded including sensed temperature of a power switch of an inverter of the test version of the power electronics module, sensed current of the test version of the power electronics module, and sensed DC-link voltage of the test version of the power electronics module.

2. The method of claim 1 further comprising implementing a Kalman filter observer to estimate the temperature using state and output equations derived from the thermal model.

3. The method of claim 2, wherein the state and output equations include the temperature from a previous iteration.

4. The method of claim 1 further comprising, upon the starting of the electric drive system, estimating the temperature based on a last estimated temperature of the DC-link capacitor and a current temperature of a power switch of the inverter.

5. The method of claim 1 further comprising, upon the starting of the electric drive system, estimating the temperature based on a maximum allowable temperature that is less than the threshold.

6. An electric drive control system comprising:
a controller programmed to
after start of the electric drive control system, reduce power output of an inverter responsive to an estimated temperature of a DC-link capacitor being greater than a threshold to maintain DC-link capacitor temperature lower than the threshold, and
upon start of the electric drive control system, generate an initial value for the estimated temperature based on a maximum allowable temperature that is less than the threshold under certain conditions and based on a last estimated temperature of the DC-link capacitor under other conditions.

7. The electric drive control system of claim 6, wherein the controller is further programmed to implement a Kalman filter observer to generate subsequent values for the estimated temperature using state and output equations derived from a thermal model of the DC-link capacitor.

8. The electric drive control system of claim 7, wherein the state and output equations include a value of the estimated temperature from a previous iteration.

\* \* \* \* \*